(12) United States Patent
Kumar et al.

(10) Patent No.: US 12,543,150 B2
(45) Date of Patent: Feb. 3, 2026

(54) SYSTEMS AND METHODS FOR MANAGING PAGING COLLISION AND PAGING FILTERS IN A USER EQUIPMENT

(71) Applicant: Samsung Electronics Co., Ltd., Gyeonggi-do (KR)

(72) Inventors: Lalith Kumar, Bangalore (IN); Varini Gupta, Bangalore (IN)

(73) Assignee: Samsung Electronics Co., Ltd (KR)

( * ) Notice: Subject to any disclaimer, the term of this patent is extended or adjusted under 35 U.S.C. 154(b) by 357 days.

(21) Appl. No.: 18/031,080

(22) PCT Filed: Oct. 8, 2021

(86) PCT No.: PCT/KR2021/013912
§ 371 (c)(1),
(2) Date: Apr. 10, 2023

(87) PCT Pub. No.: WO2022/075811
PCT Pub. Date: Apr. 14, 2022

(65) Prior Publication Data
US 2023/0379877 A1   Nov. 23, 2023

(30) Foreign Application Priority Data

Oct. 9, 2020 (IN) .............................. 202041044119
Sep. 28, 2021 (IN) .............................. 202041044119

(51) Int. Cl.
*H04W 68/02* (2009.01)
*H04W 64/00* (2009.01)

(52) U.S. Cl.
CPC ......... *H04W 68/02* (2013.01); *H04W 64/006* (2013.01)

(58) Field of Classification Search
CPC ... H04W 68/02; H04W 64/006; H04W 60/04; H04W 8/183; H04W 76/30; H04W 88/06;
(Continued)

(56) References Cited

U.S. PATENT DOCUMENTS

2013/0170438 A1* 7/2013 Nishida ............... H04W 68/005
370/328
2017/0150545 A1   5/2017 Ramkumar et al.
(Continued)

OTHER PUBLICATIONS

PCT/ISA/210 Search Report issued on PCT/KR2021/013912, Jan. 14, 2022 pp. 3.
(Continued)

*Primary Examiner* — Nimesh Patel
(74) *Attorney, Agent, or Firm* — The Farrell Law Firm, P.C.

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. According to various embodiments of the disclosure, methods and apparatuses for resolving paging occasion are provided.

16 Claims, 5 Drawing Sheets

(58) Field of Classification Search
CPC ....... H04W 8/02; H04W 8/205; H04W 76/32;
H04W 68/005; H04W 84/042; H04W
68/12; H04W 48/18; H04W 8/24; H04W
8/20; H04W 76/10; H04W 68/00; H04W
48/16; H04W 76/11; H04W 76/15; H04W
4/50; H04W 8/12; H04W 8/186; H04W
12/45; H04W 36/0066; H04W 12/72;
H04W 12/40; H04W 36/16; H04W
36/0005; H04W 28/0861; H04W 36/26;
H04W 40/36; H04W 40/24; H04W 72/02;
H04W 72/23; H04W 72/25; H04W
52/0209; H04W 48/20; H04W 48/08;
H04W 74/00; H04W 92/02; H04W
12/086; H04W 48/02; H04W 76/16;
H04W 24/02; H04W 64/00; H04W 84/12;
H04W 48/12; H04W 74/002; H04W
12/63; H04W 36/0088; H04W 48/10;
H04W 88/02; H04W 36/13; H04W 4/025;
H04W 68/025; H04W 74/085; H04W
74/0841; Y02D 30/70; H04L 65/1016;
H04L 69/24; H04L 63/10; H04L 63/205;
H04L 65/1073; H04L 63/102; H04L
63/20; H04L 63/104; H04L 65/00; H04L
63/1466; H04L 1/1887; H04L 47/805;
H04L 47/808; H04L 47/827; G08G 5/26;
G08G 5/56; G08G 5/57; H04B 7/18504;
H04B 7/1851; H04B 7/18513; H04B
7/18539; H04B 7/1856; H04B 7/18563;
H04B 7/18565; H04B 1/3833; H04B
7/0413; H04M 15/66; H04M 15/88;
H04M 1/72418; H04M 15/882; H04M
15/888; H04M 3/42; H04M 17/103;
H04M 15/49; H04M 15/8011; H04M
2207/18; H04M 1/724631; H04M
1/72463; H04M 15/58; H04M 15/83;
H04M 15/84; H04M 15/85; H04M
15/886; H04M 2250/06; G06Q 20/20;
G06Q 20/308; G06Q 20/321; G06Q
20/3229; G06Q 20/3255; G06Q 20/386;
G06F 15/16; G06F 17/00; G06F 21/35;
G06F 21/725; G06F 21/31; G06F 16/215;
A63F 13/332; A63F 2300/406

See application file for complete search history.

(56) References Cited

U.S. PATENT DOCUMENTS

| | | | |
|---|---|---|---|
| 2018/0160422 A1* | 6/2018 | Pathak | H04W 76/10 |
| 2019/0174449 A1* | 6/2019 | Shan | H04W 60/04 |
| 2019/0246342 A1* | 8/2019 | Wang | H04W 48/04 |
| 2019/0373441 A1* | 12/2019 | Ryu | H04W 48/18 |
| 2020/0267533 A1* | 8/2020 | Zhang | H04W 4/80 |
| 2020/0305118 A1* | 9/2020 | Ryu | H04W 76/10 |
| 2022/0191778 A1* | 6/2022 | Kumar | H04W 48/18 |
| 2022/0240213 A1* | 7/2022 | Ly | H04W 48/18 |
| 2022/0286993 A1* | 9/2022 | Youn | H04W 8/06 |
| 2023/0047213 A1* | 2/2023 | Chen | H04W 74/002 |

OTHER PUBLICATIONS

PCT/ISA/237 Written Opinion issued on PCT/KR2021/013912, Jan. 14, 2022 pp. 5.

Indian Examination report dated Jun. 7, 2022 issued in counterpart application IN 202041044119, pp. 5.

3GPP; TSGSA; Study on system enablers for devices having multiple Universal Subscriber Identity Modules (USIM) (Release 17), 3GPP TR 23.761 V1.0.0, Sep. 8, 2020, pp. 100.

Qualcomm Incorporated et al., "Solution for paging collision avoidance", S2-2003894, 3GPP TSG SA WG2 #139E, May 22, 2020, pp. 7.

Mediatek Inc., "MUSIM Way Forward", S2-2005504, 3GPP TSG SA WG2 #140E, Aug. 13, 2020, pp. 7.

Ericsson, "KI#3, conclusion on assistance information", S2-2007150, 3GPP TSG SA WG2 #141e, Oct. 2, 2020, pp. 7.

* cited by examiner

SYSTEMS AND METHODS FOR MANAGING PAGING COLLISION AND PAGING FILTERS IN A USER EQUIPMENT

PRIORITY

This application is a National Phase Entry of PCT International Application No. PCT/KR2021/013912, which was filed on Oct. 8, 2021, and claims priority to Indian Provisional Patent Application No. 20/204,1044119, which was filed on Oct. 9, 2020, and Indian patent application Ser. No. 20/204,1044119, which was filed on Sep. 28, 2021, the entire content of each of which is incorporated herein by reference.

TECHNICAL FIELD

The disclosure, in general, relates to network procedures performed by User Equipment (UE), and, in particular, relates to systems and methods for resolving paging collision in a UE.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

In the fourth-generation wireless communication system like Long-Term Evolution LTE, there are devices which have Multi Universal Subscriber Identity Module (M-USIM) capability. In particular, dual SIM devices have proliferated over the past decade. An operation of the dual SIM devices is transparent to a network and certain procedures like paging monitoring and responding to paging, measurements, system information acquisition etc. are currently handled in implementation specific way. In other words, there is no standard support for efficiently handling the aforementioned procedures. This has resulted not only in degrading of user experience in terms of loss of data throughput but also wastage of network resources.

Furthermore, the dual SIM devices have different radio transmit-receive (RF Tx/Rx) capability and the implementation specific solutions to handle the aforementioned procedures are not same, but, depend on the RF capability of the dual SIM device. Depending on the RF Tx/Rx capability, following types of dual SIM devices are available: a) Dual SIM Dual Standby (DSDS) with single Tx/Rx RF capability, b) Dual SIM Dual Receive (DSDR) with single Tx, and c) Ddual Rx RF capability and Dual SIM Dual Active (DSDA) with dual Tx/Rx RF capability.

The dual SIM device is required to monitor the paging occasion and other time critical occasions such as essential System Information Blocks (SIBs), Cell Broadcast Information, Multimedia Broadcast Multicast Services (MBMS) and the like, on the respective system (network) associated with each Universal Subscriber Identity Module (USIM). In general, system with each USIM independently decides these occasions. The paging occasion of one USIM may collide with paging and other time critical occasions of other USIMs. These collisions are handled in a specific manner according to UE implementations as there is no standard mechanism devised for MUSIM UE from the 3GPP standardization perspective. Therefore, this may sometime result in missing of the paging or time critical occasions for handling of paging collisions for MUSIM devices.

Solution to Problem

In accordance with an embodiments of the disclosure, a method for resolving paging collision in a User Equipment (UE) is disclosed. The method includes transmitting, by the UE, a first Non-Access Stratum (NAS) message comprising network assistance information to a first network to create a paging occasion. The network assistance information comprises a first offset value associated with at least one Subscriber Identity Module (SIM), amongst a plurality of SIMs in the UE. The method includes receiving, from the first network, a NAS response message comprising a second offset value for the UE based on a current load and policy at the first network in response to receiving the first NAS message. The method further includes determining, by the UE, a possibility of occurrence of a paging collision based on receiving the second offset from the network.

In accordance with an embodiment of the disclosure, a system for resolving paging collision in a User Equipment is disclosed. The system includes transmitting, by the UE, a first Non-Access Stratum (NAS) message comprising network assistance information to a first network to create a paging occasion. The network assistance information comprises a first offset value associated with at least one Subscriber Identity Module (SIM) amongst a plurality of SIMs in the UE. The system includes receiving, from the first network, a NAS response message comprising a second offset value for the UE based on a current load and policy at the first network in response to receiving the first NAS message. The system includes determining, by the UE, a possibility of occurrence of a paging collision based on receiving the second offset from the network.

In accordance with an embodiment of the disclosure, a method for managing a paging filter associated with a UE is disclosed. The method includes transmitting, by the UE, a first NAS message comprising one or more paging filters identifying one or more services to a network. The method includes accepting, by the network, the one or more paging filters in response to receiving the first NAS message. The method further includes transmitting, by the network, a NAS response message based on acceptance of the paging filters within the first NAS message.

In accordance with an embodiment of the disclosure, a system for managing a paging filter associated with a UE is disclosed. The system includes transmitting, by the UE, a first NAS message comprising one or more paging filters identifying one or more services to a network. The system includes accepting, by the network, the one or more paging filters in response to receiving the first NAS message. The system includes transmitting, by the network, a NAS response message based on acceptance of the one or more paging filters within the first NAS message.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

Advantageous Effects of Invention

According to various embodiments of the disclosure, methods and apparatuses for resolving paging occasion are provided.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

Figure 1:
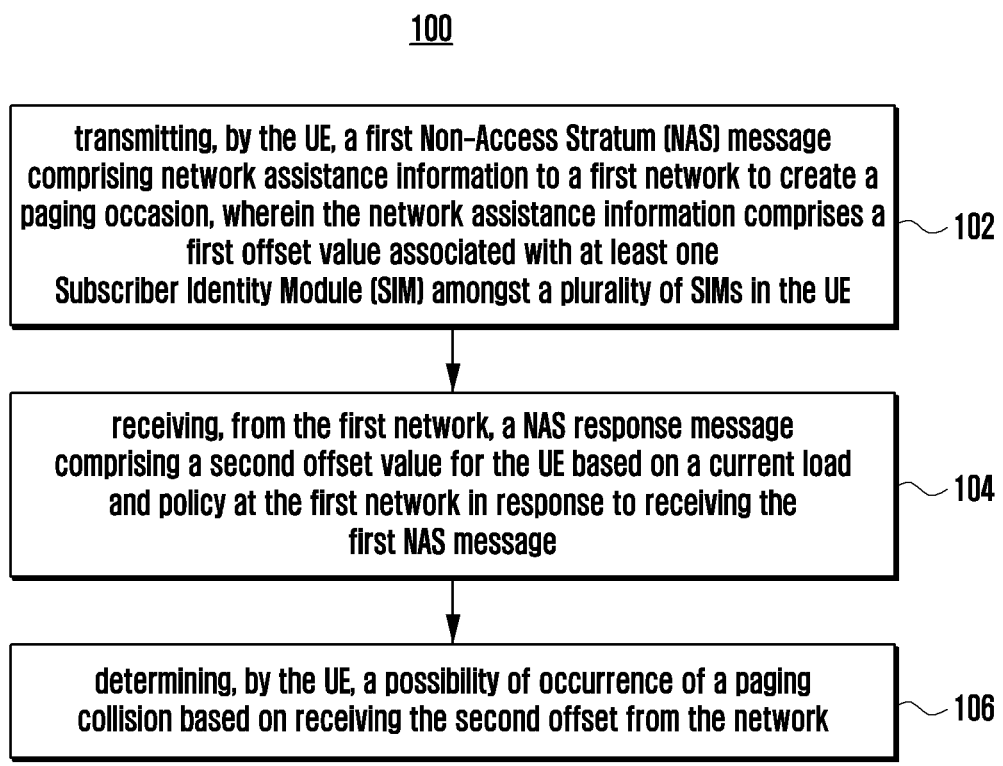
FIG. 1 illustrates a schematic block diagram depicting a method for resolving paging collision in a UE, in accordance with an embodiment of the disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

MODE FOR THE INVENTION

For promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

In MUSIM when paging collision happens between two USIMs, it is only MUSIM UE which can identify the scenario because two USIMs can belong to two different operators and there is no co-ordination between the operators. Thus both may provide same Paging occasion to be read. In such a case UE will be able to read one of the Paging occasion only from one operator and the Paging of second operator will be missed by the UE.

However, there is a problem in above approach, it is possible that most of the UEs in the area have requested for the same MUSIM (AI) like IMSI offset or at least related MUSIM AI i.e. Globally Unique Temporary Identifier (GUTI), can be 5G-GUTI or 4G-GUTI or range of alternate UE ID which leads to the problem of majority of the UEs are concentrated over the same Paging occasion(s). This becomes highly inefficient for network operations for example between time t0 to t10. Hypothetically speaking, consider a scenario where all the UEs are requesting for to use the offset such that the paging occasion t0 only is used, in the worst case for most of the UEs served by the network, or say only t0 to t5 is used. This will lead for network to make a decision which UE should page in congestion situation as only limited number of UEs can be paged in the given paging occasion as part of paging message.

If all 100 UEs are using Paging occasion t0 and if network capacity is to page only 10 UEs at t0 then out of 100 network has to select 10 UEs and page and rest 90 UEs paging will be missed at the same time network at duration t1-10 is free. This situation is not good from network operations perspective.

According to conventional techniques, MUSIM assistance may be provided from a UE side and negotiated between a UE and network in the following example ways.

Furthermore, in an example, the UE may provide "UE offset" (to be used as input value, together with IMSI/5G-S-TMSI, to calculate the UE Identity Index value in the Paging request) in registration procedure. In one embodiment UE does not provide UE offset but network assigns the second UE offset as described in this embodiment.

Furthermore, When Paging filters are requested by the UE, UE is not aware if the set Paging restrictions (PRs) are accepted by the network. Thus when paging is received by the UE, UE is not aware if paging is received for the services which UE is interested. This will lead to a situation that UE will unnecessarily respond to paging impact the services on alternate SIM because Tx is tuned to send the service request in response to paging message. Impacting the service on alternate SIM.

Thus, there is a need for a solution that overcomes the above deficiencies.

FIG. 1 illustrates a schematic block diagram 100 depicting a method for resolving paging collision in a UE, in accordance with an embodiment of the disclosure.

In an embodiment, the paging collision may be occurring between two Subscriber Identity Modules (SIMs) incorporated within the UE. In an embodiment, the paging collision may occur in the UE upon receiving a paging occasion associated with each of the two SIMs at a same instance of time.

At block 102, the method includes, transmitting, by the UE, a first Non-Access Stratum (NAS) message comprising network assistance information to a first network to create a paging occasion, wherein the network assistance information comprises a first offset value associated with at least one Subscriber Identity Module (SIM) amongst a plurality of SIMs in the UE.

At block 104, the method includes, receiving, from the first network, a NAS response message comprising a second offset value for the UE based on a current load and policy at the first network in response to receiving the first NAS message.

At block 106, the method includes, determining, by the UE, a possibility of occurrence of a paging collision based on receiving the second offset from the network.

Figure 2:
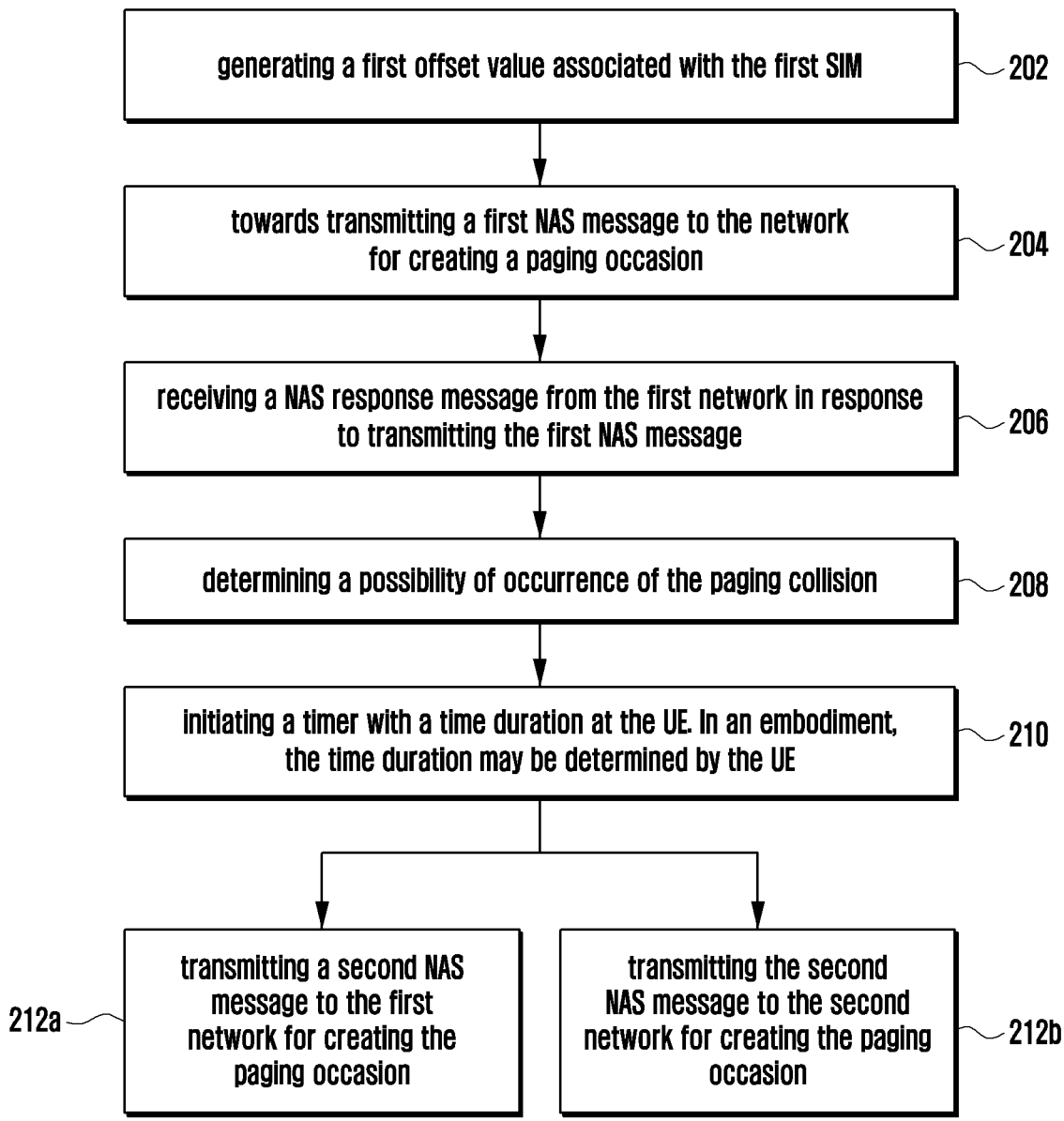
FIG. 2 illustrates an operational flow diagram depicting a process for resolving paging collision in a UE, in accordance with an embodiment of the disclosure.

FIG. 2 illustrates an operational flow diagram 200 depicting a process for resolving paging collision in a UE, in accordance with an embodiment of the disclosure.

In an embodiment, the UE may be a Multi-USIM (MUSIM) UE incorporating a plurality of SIMs. In an embodiment, a SIM may interchangeably be referred as Universal Subscriber Identity Module (USIM). In an embodiment, the paging collision may occur in an embodiment, where a paging occasion associated with the plurality of SIMs is similar. In an embodiment, the paging occasion associated with the plurality of SIMs may be determined to be same upon receiving a configuration related to paging occasions from the network.

In an embodiment, the configuration associated with the plurality of SIMs may be received from a first network and a second network. In an embodiment, the first network may be associated with a first SIM and a second network may be associated with a second SIM amongst the plurality of SIMs. In an embodiment, the UE may be configured to receive the configuration associated with the plurality of SIMs after a pre-determined interval of time. In an embodiment the configuration may be an International Mobile Subscriber Identity (IMSI) offset. In an embodiment, the predetermined interval of time may be determined by the first network and the second network associated with the plurality of SIMs.

Continuing with the above embodiment, the process may include generating (step 202) a first offset value associated with the first SIM. In an embodiment, the generation of the offset value may be based on receiving the paging associated with the first SIM from the network at the UE. In an embodiment, the first offset value may be an IMSI offset identifying the UE to the first network.

Subsequent to generating the offset value, the process may proceed towards transmitting (step 204) a first NAS message to the network for creating a paging occasion. In an embodiment, the first NAS message may include the offset value generated at step 202 associated with the first SIM. In an embodiment, the offset value may be incorporated in the first NAS message in the form of network assistance information. In an embodiment, the first NAS may also be referred as one of an attach request and a Tracking Area Update (TAU) request.

Moving forward, the process may proceed towards receiving (step 206) a NAS response message from the first network in response to transmitting the first NAS message. In an embodiment, the NAS response may include a second offset value associated with the first SIM for the UE. In an embodiment, the second offset value may be generated by the first network based on a load and a policy associated with the network. In an embodiment, the load may be associated with at least one other UE requesting the first network to create the paging occasion at a particular instant.

Continuing with the above embodiment, upon receiving the NAS response message from the first network, the process may proceed towards determining (step 208) a possibility of occurrence of the paging collision. In an embodiment, the possibility of occurrence of the paging collision may be based on determining that the second offset value received from the first network is similar to another offset value associated with the second SIM thereby creating a scenario where the paging collision may occur.

In response to determining the possibility of occurrence of the paging collision, the process may proceed towards initiating (step 210) a timer with a time duration at the UE. In an embodiment, the time duration may be determined by the UE. In an embodiment, the timer may be assigned to the UE in one of the NAS response message and an Access Stratum (AS) message. In an embodiment, the timer may be preconfigured in the UE such as a Mobile Entity (ME) or the USIM. Furthermore, upon determining that the time duration of the timer is complete upon initiating the timer, its worth noting that this step of timer is optional to implement in this embodiment, the process may proceed towards step 212a and step 212b.

In an embodiment, the process may include transmitting (step 212a) a second NAS message to the first network for creating the paging occasion. In an embodiment, the second NAS message may include a third offset value incorporated as the network assistance information. In an embodiment, the third offset value may be generated by the UE based on determining the possibility of occurrence of the paging collision at the UE.

Moving forward, the process may proceed towards transmitting (step 212b) the second NAS message to the second network for creating the paging occasion. In an embodiment, the second NAS message transmitted to the second network may include one of the first offset value, the second offset value and a third offset value incorporated as the network assistance information.

Figure 3:
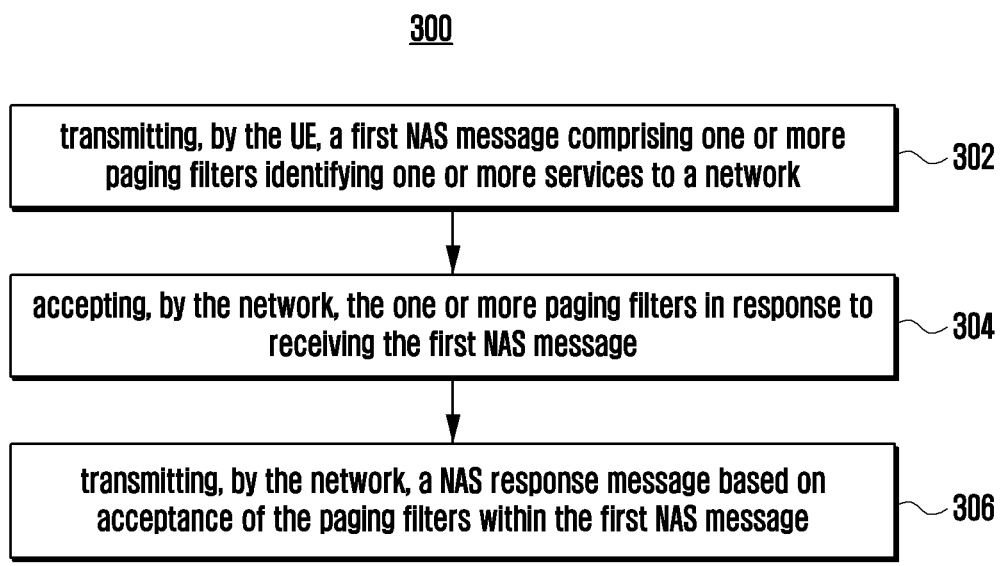
FIG. 3 illustrates a schematic block diagram of a system for managing paging filters in a UE, in accordance with an embodiment of the disclosure.

FIG. 3 illustrates a schematic block diagram 300 depicting a method for managing paging filters in a UE, in accordance with an embodiment of the disclosure.

In an embodiment, the one or more paging filters may be generated in the UE. Furthermore, the one or more paging filters may be identifying one or more services to a network. At block 302, the method includes transmitting, by the UE, a first NAS message like service request comprising one or more paging filters identifying one or more services to a network.

At block 304, the method includes accepting, by the network, the one or more paging filters in response to receiving the first NAS message.

At block 306, the method includes, transmitting, by the network, a NAS response message like service accept based on acceptance of the paging filters within the first NAS message.

Figure 4:
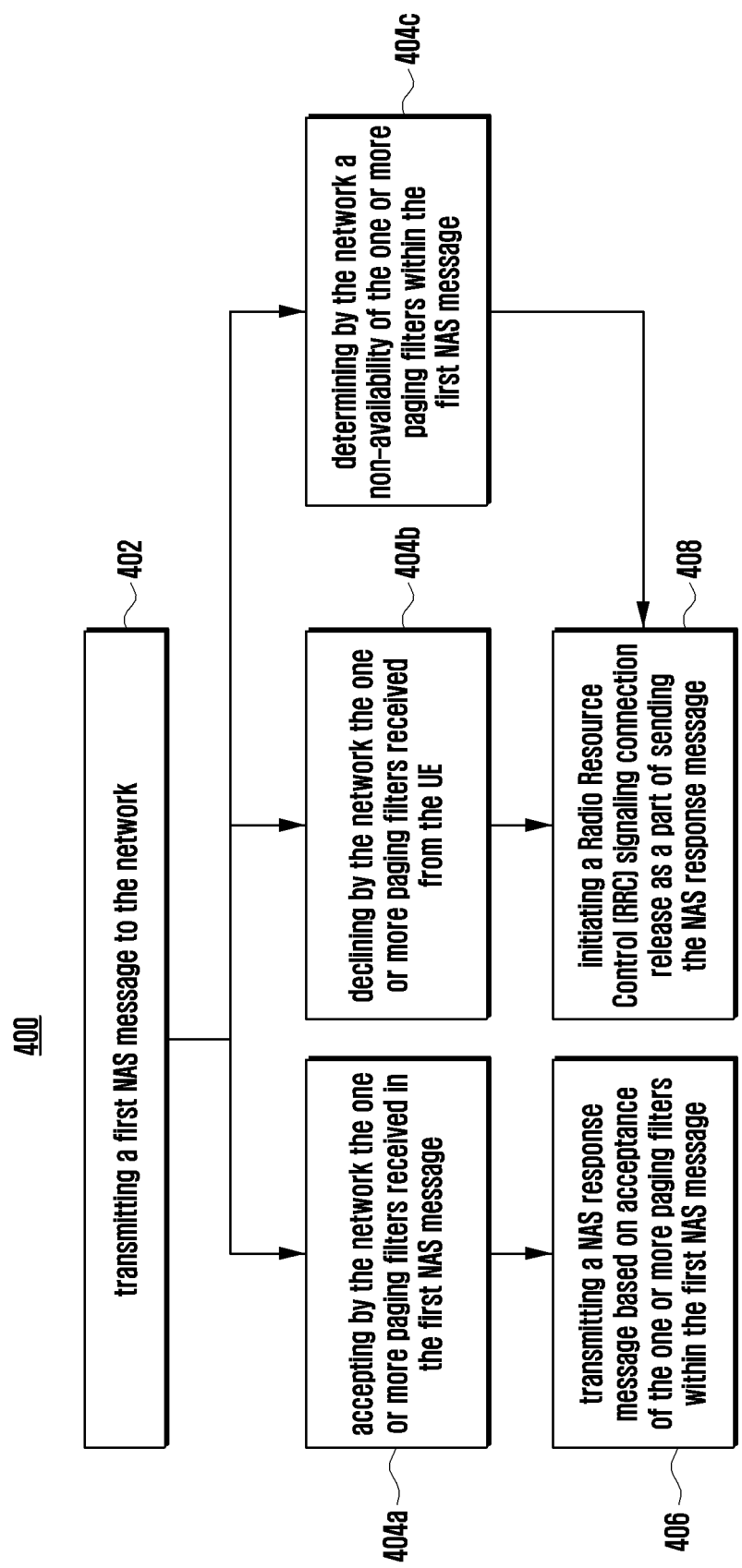
FIG. 4 illustrates an operational flow diagram depicting a process for managing paging filters in a UE, in accordance with an embodiment of the disclosure.

FIG. 4 illustrates an operational flow diagram 400 depicting a process for managing one or more paging filters in a UE, in accordance with an embodiment of the disclosure.

In an embodiment, the UE may be a MUSIM UE incorporating a number of SIMs. In an embodiment, the one or more paging filters may be generated in the UE. Furthermore, the one or more paging filters may be identifying one or more services to a network. In an embodiment, the one or more services may be associated with the number of SIMs incorporated within the UE.

Continuing with the above embodiment, the process may include transmitting (step 402) a first NAS message to the network. In an embodiment, the first NAS message may include the one or more paging filters identifying the one or more services. In an embodiment, the network may be one of a first network associated with a first SIM and a second network associated with a second SIM amongst the number of SIMs. Furthermore, the process may proceed towards one of a step 404a, a step 404b, and a step 404c.

Subsequent to receiving the first NAS message from the UE, the process may include accepting (step 404a) by the network the one or more paging filters received in the first NAS message. Upon acceptance of the one or more paging filters, the process may proceed towards step 406.

Continuing with the above embodiment, the process may include declining (step 404b) by the network the one or more paging filters received from the UE. Furthermore, upon non-acceptance of the one or more paging filters by the network, the process may proceed towards step 408.

Continuing with the above embodiment, the process may include determining (step 404c) by the network a non-availability of the one or more paging filters within the first NAS message. Furthermore, upon determining the non-availability, of the one or more paging filters by the network, the process may proceed towards step 408.

Subsequent to accepting the one or more paging filters, the process may include transmitting (step 406) a NAS response message based on acceptance of the one or more paging filters within the first NAS message. In an embodiment, the NAS response message may also be referred as a service accept message. In an embodiment, the NAS response may be transmitted by the network to the UE. In an embodiment, an Access & Mobility Management Function (AMF) at the network may be configured to store MUSIM assistance information such as an IMSI offset, and the one or more paging filters encoded in a paging filter Information Element (IE) provided by the UE. Further, the AMF may be configured to confirm to the UE with the NAS response message such as "a registration accept" message, and "a service accept" message that the AMF has stored the received MUSIM assistance information.

In an embodiment, where it is determined that a congestion is present at the network, the AMF may be configured to store the received MUSIM assistance information received in the first NAS message. Moving forward, the AMF may be configured to indicate to the UE a negotiated MUSIM assistance information. In an embodiment, the AMF may also include a back off timer such as T3346 timer or a T3448 timer optionally with the negotiated MUSIM assistance information. The indication may be provided by AMF to the UE in one of the NAS response message, and an AS message such as "registration accept", "registration reject", "service reject", "service accept", "UE configuration update" or the like. Upon receiving the NAS message such as the "service accept" or the "registration accept" the UE may be confirmed that the paging restrictions sent by the UE are set by the network. In an embodiment, the NAS message may interchangeably be referred as the first NAS message.

In one embodiment, the reception of accept message such as the registration accept message, the service accept message, a Tracking area update (TAU) accept message, the UE may treat the set MUSIM assistance information such as the one or more paging restrictions or the IMSI offset in the NAS message such as the registration request, an attach message, the TAU message or the service request message is accepted by the network. The reception of reject message such as the registration reject message, a TAU reject message, the service reject message, the UE may treat the set MUSIM assistance information such as the one or more paging restrictions or the IMSI offset in NAS message such as the registration request, the attach message, the TAU message or the service request message is not accepted by the network.

Subsequent to non-acceptance of the one or more paging filters, the process may include initiating (step 408) a Radio Resource Control (RRC) signaling connection release as a part of sending the NAS response message upon determining a nonacceptance of the one or more paging filters present within the first NAS message. In an embodiment, the RRC connection release may also be initiated upon determining a non-availability of the one or more paging filters within the first NAS message.

In an embodiment, the service request message is one of the service request message, a control plane service request message, and a extended service request message or the like.

In an embodiment, the process described in the operational flow diagram 400 may be related to 5GS network elements and may further be applicable for an Evolved Packet System (EPS) or a 4GS system. The AMF may be replaced with a Mobility Management Entity (MME). Furthermore, RAN nodes such as an eNB and an gNB may be used interchangeably.

Figure 5:
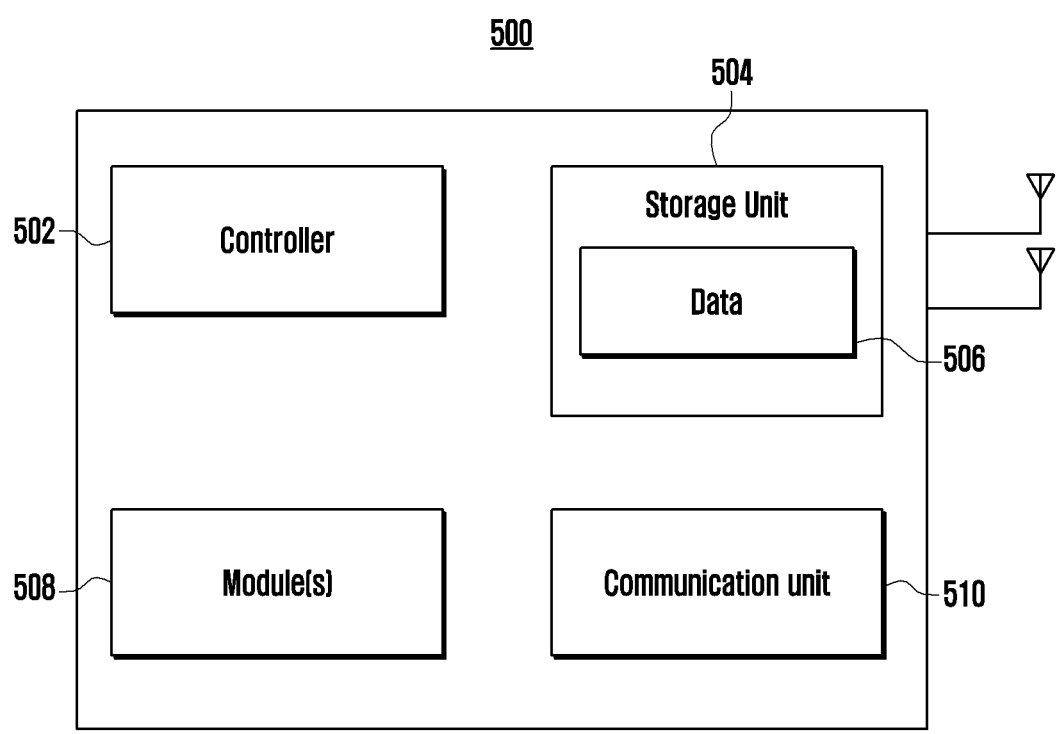
FIG. 5 is a schematic block diagram of a diagram illustrating a configuration of a terminal in a wireless communication system, in accordance with an embodiment of an embodiment of the disclosure.

FIG. 5 is a diagram illustrating the configuration of a terminal 500 in a wireless communication system according to an embodiment of the disclosure.

The configuration of FIG. 2 and FIG. 4 may be understood as a part of the configuration of the terminal 500. Hereinafter, it is understood that terms including "unit" or "er" at the end may refer to the unit for processing at least one function or operation and may be implemented in hardware, software, or a combination of hardware and software.

Referring to FIG. 5, the terminal 500 may include a controller 502 (e.g., at least one processor), a storage unit 504 (e.g., storage, memory), data 506 and, module(s) 508, and a communication unit 510 (e.g., communicator communication interface, or transceiver). By way of example, the terminal 500 may be a User Equipment (UE), such as a cellular phone or other device that communicates over a plurality of cellular networks (such as a 4G, a 5G or pre-5G network or any future wireless communication network). In an embodiment, the controller 502, the storage unit 504, the data 506, and the module(s) 508, and the communication unit 510 may be communicably coupled with one another.

As would be appreciated, the terminal 500, may be understood as one or more of a hardware, a software, a logic-based program, a configurable hardware, and the like. In an example, the controller 502 may be a single processing unit or a number of units, all of which could include multiple computing units. The processor may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the controller 502 may be configured to fetch and/or execute computer-readable instructions and/or data 506 stored in the storage unit 504.

In an example, the storage unit 504 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The storage unit 504 may store data, such as a basic program, an application program, configuration information, and the like for operating the terminal 500. The storage unit 504 may be configured as a volatile memory, a non-volatile memory, or a combination of a volatile memory and a non-volatile memory. The storage unit 504 may include the data 506. In addition, the storage unit 504 may provide data stored therein in response to a request from the controller 502.

The data 506 serves, amongst other things, as a repository for storing data processed, received, and generated by one or more of, the controller 502, the storage unit 504, the module(s) 508, and the communication unit 510.

The module(s) 508, amongst other things, may include routines, programs, objects, components, data structures, etc., which perform particular tasks or implement data types. The module(s) 508 may also be implemented as, signal processor(s), state machine(s), logic circuitries, and/or any other device or component that manipulate signals based on operational instructions.

Further, the module(s) 508 may be implemented in hardware, instructions executed by at least one processing unit, for e.g., controller 502, or by a combination thereof. The processing unit may be a general-purpose processor which executes instructions to cause the general-purpose processor to perform operations or, the processing unit may be dedicated to performing the required functions. In another aspect of the disclosure, the module(s) 508 may be machine-readable instructions (software) which, when executed by a processor/processing unit, may perform any of the described functionalities.

In some example embodiments, the module(s) 508 may be machine-readable instructions (software) which, when executed by a processor/processing unit, perform any of the described functionalities.

The controller 502 may control overall operations of the terminal 500. For example, the controller 502 may transmit and receive a signal via the communication unit 510. Further, the controller 502 records data in the storage unit 504 and reads the recorded data. The controller 502 may perform the functions of a protocol stack required by a particular communication standard. To this end, the controller 502 may include at least one processor or micro-processor or may be a part of the processor. Also, a part of the communication unit 510 and the controller 502 may be referred to as a communication processor (CP).

Referring to FIG. 2, the communication unit 510 may be configured to transmit a first Non-Access Stratum NAS message to a first network to create a paging occasion. In an embodiment, the first NAS message may include network assistance information. Furthermore, the network assistance information may include a first offset value associated with at least one Subscriber Identity Module (SIM) amongst a plurality of SIMs in the UE.

Continuing with the above embodiment, the communication unit 510 may be configured to receive a NAS response message from the first network. In an embodiment, the communication unit 510 may be configured to receive the NAS response message in response to transmitting the first NAS message to the first network. In an embodiment, the NAS response message may include comprising a second offset value for the UE. Furthermore, the second offset value shared by the first network may be based on a current load and a policy associated with the first network. In an embodiment, the load may be based on a number of NAS messages received at the first network from one or more UEs.

Continuing with the above embodiment, upon receiving the NAS response message from the first network, the controller 502 may be configured to determine a possibility of occurrence of a paging collision. In an embodiment, the possibility of occurrence of the paging collision may be based on the second offset value from the network. Moving forward, the controller 502 may be configured to initiate a timer upon determining the occurrence of the paging collision after receiving the NAS response message. Furthermore, upon completion of the time, the controller 502 may be configured to transmit one of a second NAS message including a third offset value to the first network for creating a paging occasion and the second NAS message including one of the first offset value, the second offset value and a third offset value to a second network to create the paging occasion. In an embodiment, the second NAS message may be transmitted by the communication unit 510.

Referring to FIG. 4, the UE may be communicating with a network through the communication unit 510. In an embodiment, the controller 502 may be configured to transmit a first NAS message to the network through the communication unit 510. In an embodiment, the first NAS message may include one or more paging filters identifying one or more services. Furthermore, in response to transmitting the first NAS message, the network may be configured to accept the one or more paging filters. Moving forward, the UE may be configured to receive a NAS response message indicating an acceptance of the one or more paging filters from the network at the communication unit 510.

In an embodiment, the network may not accept the one or more paging filters and initiate a Radio Resource Control (RRC) signaling connection release as a part of sending the NAS response message to the UE. In an embodiment, the network may initiate the RRC signaling connection release upon determining a non-availability of the one or more paging filters within the first NAS message.

In the disclosure, some of the configurations illustrated in FIG. 5 may not be included in the terminal 500.

In an embodiment of the disclosure, the configuration of the terminal 500 described in FIG. 5 may be applied to an AMF (or AMF entity, a network entity performing an AMF), a MME, or other network entities. For example, a network entity performing operations proposed in various embodiments of the disclosure includes include a controller (e.g., at least one processor), a storage unit (e.g., storage, memory), data and, module(s), and a communication unit (e.g., communicator, communication interface, or transceiver).

In an embodiment, a network (e.g., first network, second network) may mean a network entity performing operations proposed in various embodiments of the disclosure.

While specific language has been used to describe the disclosure, any limitations arising on account thereto, are not intended. As would be apparent to a person in the art, various working modifications may be made to the method to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The above flowcharts illustrate example methods that can be implemented in accordance with the principles of the disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the disclosure has been described with exemplary embodiments, various changes and modifications may be suggested to one skilled in the art. It is intended that the disclosure encompass such changes and modifications as fall within the scope of the appended claims. None of the description in this application should be read as implying that any particular element, step, or function is an essential element that must be included in the claims scope. The scope of patented subject matter is defined by the claims.

The invention claimed is:

1. A method performed by an access and mobility management function (AMF) in a communication system, the method comprising:
   receiving, from a terminal, a first message comprising first information on fora paging restriction associated with at least one subscriber identity module (SIM) among a plurality of SIMs in the terminal;
   determining whether to accept the paging restriction;
   in case that the paging restriction is accepted. transmitting, to the terminal, a second message comprising second information indicating that the paging restriction is accepted; and
   in case that the paging restriction is rejected, transmitting, to the terminal, the second message comprising third information indicating that the paging restriction is rejected,
   wherein the paging restriction is associated with restricting paging for a service.

2. The method of claim 1, further comprising:
   storing the first information on the paging restriction.

3. The method of claim 1,
   wherein the second message comprises at least one of a registration accept message or a service accept message.

4. The method of claim 1, further comprising
   receiving, from the terminal, a first offset value associated with an international mobile subscriber identity (IMSI) for determining a paging occasion;
   determining a second offset value based on the first offset value; and
   transmitting, to the terminal, the second offset value.

5. A method performed by a terminal in a communication system, the method comprising:
   transmitting, to an access and mobility management function (AMF), a first message comprising first information on a paging restriction associated with at least one subscriber identity module (SIM) among a plurality of SIMs in the terminal;
   in case that the paging restriction is accepted. receiving, from the AMF, a second message comprising second information indicating that the paging restriction is accepted; and
   in case that the paging restriction is rejected, receiving, from the AMF, the second message comprising third information indicating that the paging restriction is rejected,
   wherein the paging restriction is associated with restricting paging for a service.

6. The method of claim 5,
wherein the first information on the paging restriction is stored in the AMF.

7. The method of claim 5,
wherein the second message comprises at least one of a registration accept message or a service accept message.

8. The method of claim 5, further comprising
transmitting, to the AMF, a first offset value associated with an international mobile subscriber identity (IMSI) for determining a paging occasion; and
receiving, from the AMF, a second offset value determined based on the first offset value.

9. An access and mobility management function (AMF) in a communication system, the AMF comprising:
a transceiver; and
at least one processor coupled with the transceiver and configured to:
receive, from a terminal, a first message comprising first information on a paging restriction associated with at least one subscriber identity module (SIM) among a plurality of SIMs in the terminal,
determine whether to accept the paging restriction,
in case that the paging restriction is accepted. transmit, to the terminal, a second message comprising second information indicating that the paging restriction is accepted, and
in case that the paging restriction is rejected. transmit. to the terminal, the second message comprising third information indicating that the paging restriction is rejected,
wherein the paging restriction is associated with restricting paging for a service.

10. The AMF of claim 9, wherein the at least one processor is further configured to:
store the first information on the paging restriction.

11. The AMF of claim 9,
wherein the second message comprises at least one of a registration accept message or a service accept message.

12. The AMF of claim 9, wherein the at least one processor is further configured to:
receive, from the terminal, a first offset value associated with an international mobile subscriber identity (IMSI) for determining a paging occasion,
determine a second offset value based on the first offset value, and
transmit, to the terminal, the second offset value.

13. A terminal in a communication system, the terminal comprising:
a transceiver; and
at least one controller coupled with the transceiver and configured to:
transmit, to an access and mobility management function (AMF), a first message comprising first information on a paging restriction associated with at least one subscriber identity module (SIM) among a plurality of SIMs in the terminal,
in case that the paging restriction is accepted, receive, from the AMF, a second message comprising second information indicating that the paging restriction is accepted, and
in case that the paging restriction is rejected, receive. from the AMF. the second message comprising third information indicating that the paging restriction is rejected,
wherein the paging restriction is associated with restricting paging for a service.

14. The terminal of claim 13,
wherein the first information on the paging restriction is stored in the AMF.

15. The terminal of claim 13,
wherein the second message comprises at least one of a registration accept message or a service accept message.

16. The terminal of claim 13, wherein the at least one processor is further configured to:
transmit, to the AMF, a first offset value associated with an international mobile subscriber identity (IMSI) for determining a paging occasion, and
receive, from the AMF, a second offset value determined based on the first offset value.

\* \* \* \* \*